(12) United States Patent
Thadani

(10) Patent No.: US 7,225,316 B2
(45) Date of Patent: May 29, 2007

(54) MEMORY MAPPING APPARATUS, SYSTEMS, AND METHODS

(75) Inventor: Manoj I. Thadani, Marlborough, MA (US)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 10/716,021

(22) Filed: Nov. 17, 2003

(65) Prior Publication Data
US 2005/0108447 A1 May 19, 2005

(51) Int. Cl.
*G06F 12/08* (2006.01)

(52) U.S. Cl. .................. 711/202; 711/203; 711/209; 710/22

(58) Field of Classification Search ............ None
See application file for complete search history.

(56) References Cited

U.S. PATENT DOCUMENTS

| | | | | |
|---|---|---|---|---|
| 5,148,922 A | * | 9/1992 | Marriott | 209/489 |
| 5,235,697 A | * | 8/1993 | Steely et al. | 711/137 |
| 5,301,287 A | * | 4/1994 | Herrell et al. | 711/202 |
| 5,659,798 A | * | 8/1997 | Blumrich et al. | 710/26 |
| 5,828,903 A | * | 10/1998 | Sethuram et al. | 710/53 |
| 5,918,245 A | * | 6/1999 | Yung | 711/122 |
| 6,356,990 B1 | * | 3/2002 | Aoki et al. | 711/205 |
| 6,625,715 B1 | * | 9/2003 | Mathews | 711/207 |
| 6,662,272 B2 | * | 12/2003 | Olarig et al. | 711/129 |
| 6,874,077 B2 | * | 3/2005 | Lyon | 711/207 |
| 6,941,390 B2 | * | 9/2005 | Odom | 710/22 |
| 2003/0177332 A1 | * | 9/2003 | Shiota | 711/203 |
| 2005/0076156 A1 | * | 4/2005 | Lowell | 710/1 |

OTHER PUBLICATIONS

Murdocca, Miles J., "Principles of Computer Architecture", Prentice Hall, Upper Saddle River, NJ 2000 p. 131-132, 270-273 and p. 312.*

* cited by examiner

*Primary Examiner*—Hyung Sough
*Assistant Examiner*—Kaushik Patel
(74) *Attorney, Agent, or Firm*—Schwegman, Lundberg, Woessner & Kluth, P.A.

(57) ABSTRACT

An apparatus and a system, as well as a method and article, may operate to map, by an operating system, a range of virtual addresses to a range of physical addresses, wherein a subset of the range of virtual addresses is identity-mapped to a subset of the range of physical addresses. This range of addresses can then be used by heavy data transfer applications in conjunction with a DMA engine to transfer data between memories, or between memory and input/output devices.

21 Claims, 4 Drawing Sheets

PAGETABLESETUP:

PHYSICAL ADDRESS ← a

TOTAL ID MAPPED REGION SIZE ← 4MB

X ← START ADDRESS OF ID MAPPED SPACE

FOR i ← 0 TO i ← NUMBER OF PAGES   //SIZE DETERMINES TOTAL
                                     NUMBER OF IDENTITY MAPPED
                                     PAGES RESERVED//

IF PHYSICAL ADDRESS >= X AND PHYSICAL ADDRESS <= X + SIZE
    THEN VIRTUAL ADDRESS = X   //SPECIAL CASE TO HANDLE
                                     IDENTITY MAPPED SPACE//

ELSE

VIRTUAL ADDRESS = f(X)   //ASSUMING f(X) IS THE
                                     MAPPING FUNCTION USED
                                     UNDER NORMAL
                                     CIRCUMSTANCES//
NEXT i

//REGULAR PAGE TABLE SETUP CONTINUES//

IMMALLOC(SIZE):

OUTCOME ← MALLOC (X, X + TOTAL ID MAPPED REGION SIZE, ALLOCATESIZE)

IF OUTCOME = FAILURE THEN
    TRY TO GROW ID MAPPED SPACE DEPENDING UPON MAXIMUM
    ALLOWABLE LIMIT

IF NOT ABLE TO GROW THE SPACE
        OUTCOME ← NULL

ELSE

OUTCOME ← MALLOC(X, X+NEW TOTAL ID MAPPED REGION
        SIZE, ALLOCATESIZE)

RETURN (OUTCOME)

MEMORY MAPPING APPARATUS, SYSTEMS, AND METHODS

TECHNICAL FIELD

Various embodiments described herein relate to data processing generally, including apparatus, systems, and methods used to transfer data between various devices, such as storage media.

A portion of this document contains material which is subject to copyright protection. The copyright owner has no objection to the facsimile reproduction by anyone of this document or other items including the protected material as maintained in the Patent and Trademark Office records, but otherwise reserves all rights whatsoever in this material. The following notice applies to the software and data as described below and in any drawings attached hereto: Copyright© 2003 Intel Corporation. All Rights Reserved.

BACKGROUND INFORMATION

Direct memory access (DMA) operations can be used to rapidly transfer large amounts of data to/from memory and peripherals. The DMA engine is an agent residing (at least functionally, if not physically) between the processor core and physical memory/peripheral input-output devices. During conventional DMA activity, the DMA engine operates to transfer data, leaving the central processing unit (CPU) free to perform other tasks.

The memory management unit (MMU) typically translates virtual memory addresses to physical memory addresses. An operating system (OS) environment typically requires the MMU to operate in virtual mode. However, some architectures lack the ability for the DMA engine to communicate directly with the MMU for address translation purposes (e.g., system-on-chip (SoC) ARM® architectures implementing a gather/scatter operation), such that DMA activity is limited to physical addresses. In these cases, data is typically copied from application buffers to driver buffers having known physical addresses prior to initiating a DMA operation. However, if the DMA buffers are relatively large, a significant amount of time may be required to copy the data, precluding the execution of other tasks. Improved apparatus, systems, and methods for conducting DMA operations in these instances are needed.

BRIEF DESCRIPTION OF THE DRAWINGS

FIG. 1 illustrates pseudo code which may be used to configure memory page tables and allocate memory according to various embodiments;

DETAILED DESCRIPTION

Figure 2:
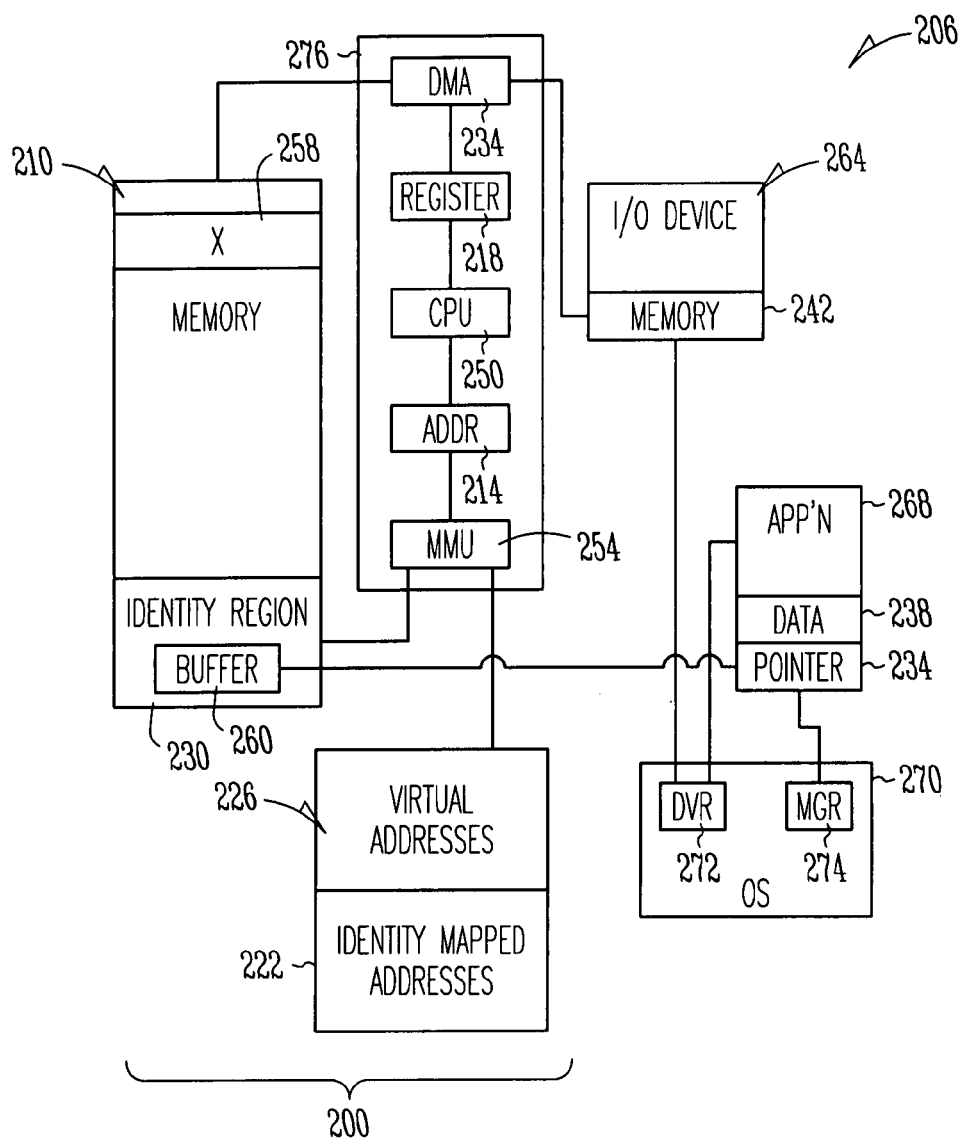
FIG. 2 is a block diagram of apparatus and systems according to various embodiments.

To enhance the efficiency of DMA operations, some embodiments may operate to provide identity mapping of memory, indicating one or more specific DMA buffer locations at the OS level. For the purposes of this document, the terms "identity-mapped" or "identity mapping" mean that one or more virtual addresses have been specified to be identical to (i.e., the same as) directly corresponding physical addresses. For example, if the following map is set up:

virtual address FF00=physical address FF00,
virtual address FF01=physical address FF01,
... and so on, up to ...
virtual address FFFF=physical address FFFF, then the range of virtual addresses FF00 to FFFF have been identity-mapped to the range of physical addresses FF00 to FFFF.

In some embodiments, an application or application interface (API) may allocate a memory buffer from an identity-mapped memory space. The buffer may then be filled with data and passed down to the device driver. The device driver can then use a pointer in the identity-mapped memory space to set up one or more DMA descriptors. Thereafter, DMA operations may be performed without copying the data to the driver's buffer, eliminating memory copy operations which may have been required for certain architectures in which the DMA engine was unable to communicate with a resident MMU. Thus, in some embodiments, data transfer throughput may be increased because transfers can be completed more quickly, which may also allow the processor to spend more time in the idle state, reducing power consumption.

For example, using an Intel® Xscale™ PXA 250/210 application processor running the Windows® CE operating system, an Intel® integrated performance primitives (IPP) Moving Pictures Experts Group (MPEG) player can be modified to use an identity-mapped buffer in the global driver space of the Windows® CE board support package (BSP). The appropriate driver, after receiving access to the buffer, can then use a DMA operation to transfer the buffer content without the need to first copy the data to the buffer. A pointer can be passed to the DMA engine driver to complete the operation.

For more information regarding MPEG standards, including MP3 (MPEG-1 Audio, Layer 3), please refer to the Moving Pictures Experts Group (MPEG) Standards, including one or more of Parts 1, 2, and 4 of the ISO/IEC JTC1/SC29/WG11 International Standard, such as, for example, Coding Of Moving Pictures And Associated Audio For Digital Storage Media At Up To About 1.5 Mbit/s, MPEG-1 International Standard, ISO/IEC 11172 Parts 1–5, 1993–1998; Generic Coding Of Moving Pictures And Associated Audio Information, MPEG-2 International Standard, ISO/IEC 13818 Parts 1–10, 1996–2000; and Coding of Moving Pictures and Audio, MPEG-4 International Standard, ISO/IEC JTC1/SC29/WG11 N4668, March 2002.

FIG. 1 illustrates pseudo code which may be used to configure memory page tables and allocate memory according to various embodiments. As an example, consider the situation in which a BSP vendor decides to configure a 4 MB memory region as an identity-mapped memory region. A page table mapping algorithm to effect this configuration is shown in FIG. 1.

First, a physical address is assigned a value, for example "a". Then the "size" parameter is set to 4 MB. "X" may be the assumed start address of the identity-mapped region. Then, "i" (the number of pages reserved as identity-mapped space) may be determined by "size", and every that is greater than or equal to "X" and less than or equal to "X+size" can be identity-mapped to the same physical address. The regular mapping function "f(X)" may be used to determine which physical address is to be used in conjunction with virtual addresses outside of the range "X" to "X+size". f(X) may be dictated by the OS in use.

An "ImMalloc" routine, perhaps included in the OS, is also shown in FIG. 1. The ImMalloc routine can be used to allocate buffers from an identity-mapped memory region, and assumes the availability of an OS system call "malloc" to receive parameters such as "start address", "end address", and "allocatesize" (i.e., the size of the memory to be allocated). The malloc function may be offered by system memory management and is typically responsible for finding space within the specified region, allocating the space for use, and returning a pointer to the allocated space. If insufficient space is available for allocation, a garbage collection algorithm, known to those of skill in the art, may be initiated to free up space so that allocation can be retried.

Thus, as shown in FIG. 1, the ImMalloc routine may be passed an "allocatesize" parameter, indicating the size of the identity-mapped region to be allocated. If there is sufficient memory available in the region to accommodate "allocatesize", then the "Outcome" may be successful, and a pointer to the allocated portion of the identity-mapped region will be returned. However, if there is insufficient memory in the identity-mapped region, and the size of the region cannot be increased or grown, the routine may return a NULL pointer.

The ability to increase or grow the size of the identity-mapped region may be implemented or not. If there is no provision to increase the region size, then the ImMalloc routine may directly return a NULL pointer, indicating failure to allocate a portion of the identity-mapped region. However, if the ImMalloc routine has the capability to increase the region size, and is successful in allocating some of the identity-mapped region, a pointer may be returned to the caller (e.g., an associated application or API). The caller can then store the data in this allocated area and pass the pointer to the DMA engine driver. The DMA engine driver may then fill the descriptor using this pointer and pass it on to the DMA engine for data transfer.

It should be noted that the ImMalloc routine normally would not be used as a substitute for the standard malloc routine. In addition, since a relatively small space may be reserved for the identity-mapped region, applications should be set up to use identity-mapped space efficiently.

FIG. 2 is a block diagram of apparatus 200 and systems 206 according to various embodiments, each of which may operate in the manner described above. For example, an apparatus 200 may comprise a mapped memory 210 having a range of physical addresses 214 and a register 218 associated with the mapped memory 210 to indicate a subset 222 of a range of virtual addresses 226 associated with the mapped memory 210 that is identity-mapped to a subset 230 of the range of physical addresses 214.

The apparatus 200 may include a module 234, such as a DMA engine, module, or circuit, to receive a pointer 236 to the subset 222 of the range of virtual addresses 226 and to transfer data 238 between the subset 230 of the range of physical addresses 214 and a peripheral memory 242 using a DMA operation. The peripheral memory 242 may comprise a random access memory (RAM), a FLASH memory, a disk drive, a first-in, first-out (FIFO) memory, or any other storage medium.

The apparatus 200 may include a processor 250 coupled to a memory mapping unit 254 including at least one fixed address 258 within the range of physical addresses 214. The apparatus 200 may also include a buffer 260 allocated from the subset 230 of the range of physical addresses 214.

In some embodiments, a system 206 may comprise one or more elements of an apparatus 200 as described above, including a peripheral memory 242, a mapped memory 210 having a range of physical addresses 214, and a module 234, such as a DMA module, to be coupled to the peripheral memory 242 and to the mapped memory 210. The system 206 may also include an input/output (I/O) device 264, including a display, to be coupled to the peripheral memory 242.

As noted previously, the subset 222 of the range of virtual addresses 226 associated with the mapped memory 210 may be identity-mapped to the subset 230 of the range of physical addresses 214. In addition, as noted above, the peripheral memory 242 may comprise any number and type of storage media, including for example, a graphics frame buffer associated with the I/O device 264, such as a display.

The system 206 may also include an application module 268 having a pointer 236, such as a virtual pointer, associated with the range of virtual addresses 222. Application data 238 processed by the application module 268 may be communicated between the range of virtual addresses 222 and the peripheral memory 242 by passing the pointer 236 to the module 234. Thus, the module 234 may be used to transfer the application data 238 from the subset 230 of the range of physical addresses 214 to the peripheral memory 242 in response to receiving the pointer 236 to the subset 222 of the range of virtual addresses 226.

The apparatus 200 and system 206 may each comprise an OS 270, which may be coupled to one or more drivers 272, including a DMA engine driver, as well as a memory manager 274. The OS 270, driver 272, and memory manager 274 may interact as described above to pass pointers 236 and communicate data 238 between applications 268 and the peripheral memory 242. The physical addresses, register 218, module 234, processor 250, and/or memory mapping unit 254 may be implemented as one or more integrated circuits on a single chip 276.

The apparatus 200, systems 206, mapped memory 210, physical addresses 214, register 218, subset 222, range of virtual addresses 226, module 234, data 238, peripheral memory 242, processor 250, memory mapping unit 254, fixed address 258, buffer 260, display 264, application module 268, OS 270, driver 272, memory manager 274, and chip 276 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 200 and the systems 206, and as appropriate for particular implementations of various embodiments.

It should also be understood that the apparatus and systems of various embodiments can be used in applications other than for computers having peripheral memories, including graphic displays, and thus, various embodiments are not to be so limited. The illustrations of apparatus 200 and systems 206 are intended to provide a general understanding of the structure of various embodiments, and they are not intended to serve as a complete description of all the elements and features of apparatus and systems that might make use of the structures described herein.

Applications which may include the novel apparatus and systems of various embodiments include electronic circuitry used in high-speed computers, communication and signal processing circuitry, modems, processor modules, embedded processors, and application-specific modules, including multilayer, multi-chip modules. Such apparatus and systems may further be included as sub-components within a variety of electronic systems, such as televisions, telephones, personal computers, workstations, radios, video players, vehicles, and others.

Figure 3:
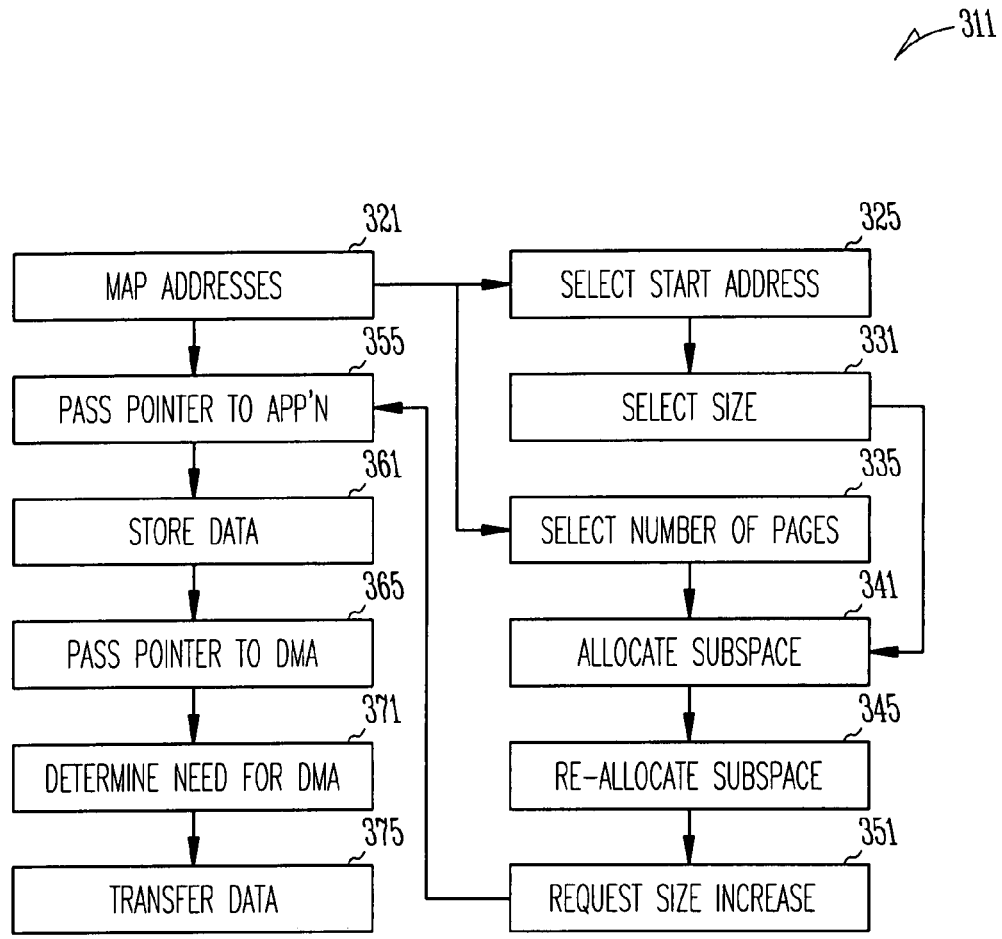
FIG. 3 is a flow chart illustrating several methods according to various embodiments.

FIG. 3 is a flow chart illustrating several methods according to various embodiments. A method 311 may (optionally) begin with mapping, by an operating system, a range of virtual addresses to a range of physical addresses, wherein a subset of the range of virtual addresses is identity-mapped to (i.e., the same as) a subset of the range of physical addresses at block 321. The subset of the range of virtual addresses may comprise at least a portion of a page table, and mapping may occur via the operation of a memory management unit.

Mapping at block 321 may further comprise selecting a start address of the subset of the range of physical addresses at block 325, and selecting a size of the subset of the range of physical addresses at block 331. Mapping at block 321 may also comprise selecting a number of pages to reserve as the subset of the range of physical addresses at block 335.

The method 311 may also include allocating the subset of the range of physical addresses for use by a direct memory access module at block 341, as well as re-allocating the subset of the range of physical addresses for use by the direct memory access module at block 345 (e.g., as part of growing the size of the identity-mapped region). The method 311 may thus include requesting an increase in a size of the subset of the range of physical addresses at block 351.

The method 311 may further include passing a pointer to allocated space to the application, perhaps via the operation of a memory manager module at block 355, storing application data in the subset of the range of virtual addresses at block 361, and passing a virtual address pointer associated with the subset of the range of virtual addresses to a direct memory access module (e.g., a DMA engine) at block 365. This activity may also include determining whether there is a need to transfer application data using the direct memory access module at block 371.

Finally, the method 311 may include transferring application data between the subset of the range of virtual addresses and a peripheral device by passing a virtual pointer associated with the subset of the range of virtual addresses to a direct memory access module at block 375. As noted above, application data may also be transferred between the subset of the range of virtual addresses and a FIFO memory included in a peripheral device.

It should be noted that the methods described herein do not have to be executed in the order described, or in any particular order. Moreover, various activities described with respect to the methods identified herein can be executed in serial or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or interprocess communication techniques, including remote procedure calls. The teachings of various embodiments of the present invention are not limited to any particular programming language or environment, including Hypertext Markup Language (HTML) and Extensible Markup Language (XML).

Figure 4:
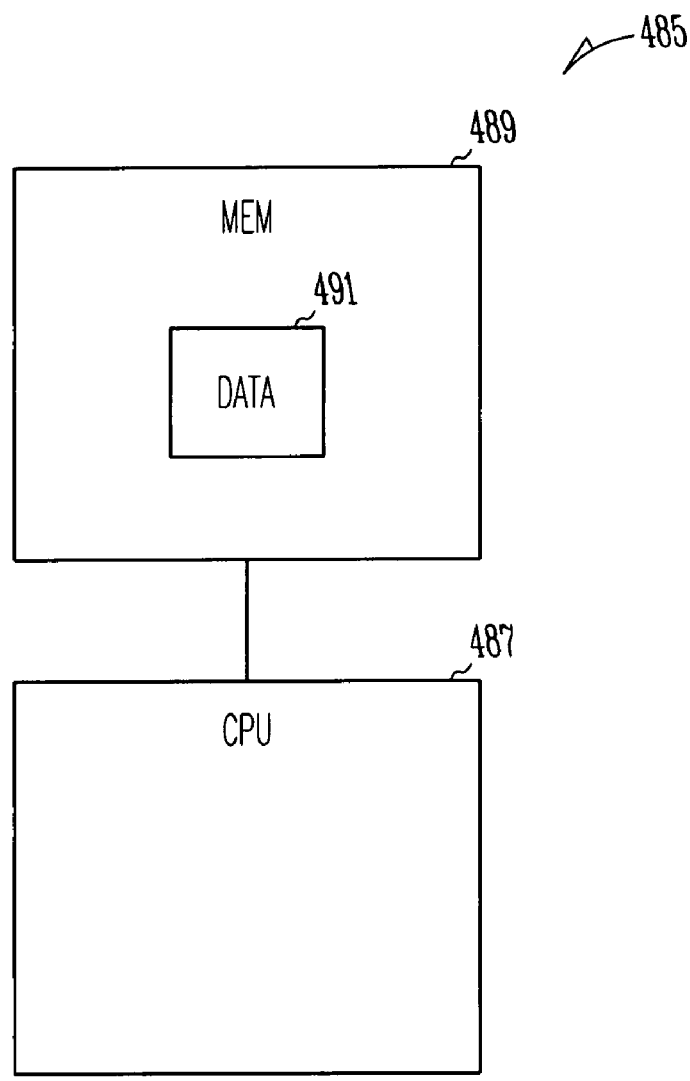
FIG. 4 is a block diagram of several articles according to various embodiments.

FIG. 4 is a block diagram of several articles 485 according to various embodiments, including a computer, a memory system, a magnetic or optical disk, some other storage device, and/or any type of electronic device or system. The article 485 may comprise a processor 487 and a machine-accessible medium such as a memory 489 (e.g., a memory including an electrical, optical, or electromagnetic conductor). The memory 489 may include associated data 491 (e.g., computer program instructions), which when accessed, results in a machine (e.g., the processor 487) performing such actions as mapping, by an operating system, a range of virtual addresses to a range of physical addresses, wherein a subset of the range of virtual addresses is identity-mapped to (i.e., is the same as) a subset of the range of physical addresses.

Other activities may include, as noted previously, storing application data in the subset of the range of virtual addresses, and passing a virtual address pointer associated with the subset of the range of virtual addresses to a direct memory access module. The data, when accessed, may also result in the machine performing such activities as determining a need to transfer application data using a direct memory access module, and storing the application data in the subset of the range of physical addresses by writing the application data to the subset of the range of virtual addresses.

Further activities may include transferring application data between the subset of the range of virtual addresses and a peripheral device by passing a virtual pointer associated with the subset of the range of virtual addresses to a direct memory access module. In this case, the application data may be transferred between the subset of the range of virtual addresses and a first-in first-out memory included in a peripheral device.

Thus, various embodiments may operate to enhance the efficiency of DMA operations by providing identity mapping of memory, indicating specific DMA buffer locations at the OS level. Thereafter, DMA operations may be performed without copying the data to driver buffers, eliminating memory copy operations which may have been required for certain architectures. Some embodiments may also operate to accommodate designs where virtual addresses are converted to physical addresses, which are in turn passed on to a DMA engine, even when application buffers are contiguous in virtual memory and discontinuous in physical memory.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   mapping, by an operating system, a range of virtual addresses to a range of physical addresses, wherein a subset of the range of virtual addresses is identity-mapped to a subset of the range of physical addresses; and
   passing a virtual address pointer associated with the subset of the range of virtual addresses to a direct memory access module to access the subset of the range of physical addresses by the direct memory access module without translating the virtual address pointer.

2. The method of claim 1, wherein the subset of the range of virtual addresses comprises at least a portion of a page table.

3. The method of claim 1, wherein mapping further comprises:
   selecting a start address of the subset of the range of physical addresses; and
   selecting a size of the subset of the range of physical addresses.

4. The method of claim 1, wherein mapping further comprises:
   selecting a number of pages to reserve as the subset of the range of physical addresses.

5. The method of claim 1, further comprising:
   allocating the subset of the range of physical addresses for use by the direct memory access module.

6. The method of claim 5, further comprising:
   re-allocating the subset of the range of physical addresses for use by the direct memory access module.

7. The method of claim 5, further comprising:
   requesting an increase in a size of the subset of the range of physical addresses.

8. An article comprising a machine-accessible medium having associated data, wherein the data, when accessed, results in a machine performing:
   mapping, by an operating system, a range of virtual addresses to a range of physical addresses, wherein a subset of the range of virtual addresses is identity-mapped to a subset of the range of physical addresses; and
   passing a virtual address pointer associated with the subset of the range of virtual addresses to a direct memory access module to access the subset of the range of physical addresses by the direct memory access module without translating the virtual address pointer.

9. The article of claim 8, wherein the data, when accessed, results in the machine performing:
storing application data in the subset of the range of virtual addresses.

10. The article of claim 8, wherein the data, when accessed, results in the machine performing:
    determining a need to transfer application data using the direct memory access module; and
    storing the application data in the subset of the range of physical addresses by writing the application data to the subset of the range of virtual addresses.

11. The article of claim 8, wherein the data, when accessed, results in the machine performing:
    transferring application data between the subset of the range of virtual addresses and a peripheral device by passing the virtual pointer associated with the subset of the range of virtual addresses to the direct memory access module.

12. The article of claim 8, wherein the data, when accessed, results in the machine performing:
    transferring the application data between the subset of the range of virtual addresses and a first-in first-out memory included in a peripheral device.

13. An apparatus, comprising:
    a mapped memory having a range of physical addresses; and
    a direct memory access module to receive a virtual pointer to a subset of a range of virtual addresses that is identity-mapped to the range of physical addresses and to transfer data between the range of physical addresses and a peripheral memory using a direct memory access operation without translating the virtual pointer.

14. The apparatus of claim 13, further comprising:
    a register associated with the mapped memory to indicate that the subset of the range of virtual addresses is identity-mapped to the range of physical addresses.

15. The apparatus of claim 14, wherein the peripheral memory comprises a first-in first-out memory.

16. The apparatus of claim 13, further comprising:
    a processor associated with a memory map including at least one fixed address included in the range of physical addresses.

17. The apparatus of claim 13, further comprising:
    a buffer allocated from the subset of the range of physical addresses.

18. A system, comprising:
    a peripheral memory;
    a mapped memory having a range of physical addresses;
    a direct memory access module to be coupled to the peripheral memory and to the mapped memory, wherein a subset of a range of virtual addresses associated with the mapped memory is identity-mapped to the range of physical addresses, and wherein a virtual pointer associated with the subset is to be received by the direct memory access module to implement a direct memory access operation without translating the virtual pointer; and
    a display to be coupled to the peripheral memory.

19. The system of claim 18, wherein the peripheral memory comprises a graphics frame buffer.

20. The system of claim 18, further comprising:
    an application module including the virtual pointer, wherein application data processed by the application module can be communicated between the range of virtual addresses and the peripheral memory by passing the virtual pointer to a direct memory access module.

21. The system of claim 18, wherein the direct memory access module is to transfer application data from the subset of the range of physical addresses to the peripheral memory in response to receiving the virtual pointer.

* * * * *